US009602538B1

(12) United States Patent
Chou (10) Patent No.: US 9,602,538 B1
(45) Date of Patent: Mar. 21, 2017

(54) NETWORK SECURITY POLICY ENFORCEMENT INTEGRATED WITH DNS SERVER (75) Inventor: Tsun-Sheng Chou, Taipei (TW)

(73) Assignee: TREND MICRO INCORPORATED, Tokyo (JP)

( * ) Notice: Subject to any disclaimer, the term of this patent is extended or adjusted under 35 U.S.C. 154(b) by 2394 days.

(21) Appl. No.: 11/386,558

(22) Filed: Mar. 21, 2006

(51) Int. Cl.
G06F 17/20 (2006.01)
H04L 29/06 (2006.01)
G06F 21/62 (2013.01)

(52) U.S. Cl.
CPC .......... H04L 63/20 (2013.01); G06F 21/6218 (2013.01); H04L 63/102 (2013.01)

(58) Field of Classification Search
CPC .... H04L 63/20; H04L 63/102; G06F 21/6218
USPC ...... 726/1, 2-4, 13, 17, 21-29, 11; 713/154, 713/166-167; 709/224, 249, 217, 709/218-220, 223
See application file for complete search history.

(56) References Cited

U.S. PATENT DOCUMENTS

| 6,353,874 | B1 * | 3/2002 | Morein | 711/118 |
| 7,313,815 | B2 * | 12/2007 | Pazi et al. | 726/7 |
| 7,730,481 | B2 | 6/2010 | Chou | |
| 2003/0005334 | A1 * | 1/2003 | Wesinger et al. | 713/201 |
| 2003/0055962 | A1 * | 3/2003 | Freund et al. | 709/225 |
| 2004/0064727 | A1 * | 4/2004 | Yadav | 713/201 |
| 2004/0107360 | A1 * | 6/2004 | Herrmann et al. | 713/201 |
| 2004/0167984 | A1 * | 8/2004 | Herrmann | 709/229 |
| 2005/0097199 | A1 * | 5/2005 | Woodard et al. | 709/223 |
| 2005/0182967 | A1 * | 8/2005 | Phillips et al. | 713/201 |
| 2005/0204039 | A1 * | 9/2005 | Douglis et al. | 709/225 |
| 2005/0273841 | A1 * | 12/2005 | Freund | 726/1 |
| 2006/0090196 | A1 * | 4/2006 | van Bemmel et al. | 726/4 |
| 2006/0101409 | A1 * | 5/2006 | Bemmel | 717/126 |
| 2006/0130139 | A1 * | 6/2006 | Sobel et al. | 726/22 |
| 2006/0282388 | A1 * | 12/2006 | Solomon et al. | 705/52 |
| 2007/0033645 | A1 * | 2/2007 | Jones | 726/12 |

(Continued)

FOREIGN PATENT DOCUMENTS

DE WO 2005/064429 A1 * 7/2005

OTHER PUBLICATIONS

Ahmad A. Hassan et al., "EORBAC Based Network Security Management Toolkit," 2009, IEEE, pp. 1-6.*

(Continued)

Primary Examiner — Luu Pham
Assistant Examiner — Canh Le
(74) Attorney, Agent, or Firm — Beyer Law Group LLP (57) ABSTRACT A plug-in software module of a DNS server helps to enforce a network security policy. The plug-in module scans communication packets at a DNS server computer and intercepts a request from a user computer to access a web site. The intercepted request is not received by the DNS service. The plug-in module initiates a security check of the user computer over a network connection to determine if the user computer has implemented the security policy of the computer network. If the user computer does not implement the security policy then the plug-in module returns an IP address to the user computer that is the IP address of a security web site. The security web site then displays on the user's browser an indication of a security policy to be applied. The security web site may also perform the security check.

35 Claims, 5 Drawing Sheets (56) References Cited

U.S. PATENT DOCUMENTS

2007/0143392 A1* 6/2007 Choe et al. .................. 709/203

OTHER PUBLICATIONS

Matteo Milgliavacca et al., "Distributed Middleware Enforcement of Event Flow Security Policy," LNCS 6452, pp. 334-354., 2010.*

* cited by examiner

FIG. 3 Policy Enforcement System

NETWORK SECURITY POLICY ENFORCEMENT INTEGRATED WITH DNS SERVER

CROSS-REFERENCE TO RELATED APPLICATIONS

This application is related to U.S. patent application Ser. No. 10/841,968.

FIELD OF THE INVENTION

The present invention relates generally to network security technology. More specifically, the present invention relates to enforcement of security policies on a computer network.

BACKGROUND OF THE INVENTION

The widespread popularity of electronic mail and the Internet has resulted in a greater risk of a user's computer being infected by a computer virus or other malicious software, particularly in the enterprise environment. Computer virus, worm or spyware infection, though, reduces productivity and causes great damage. A security software policy can be implemented by requiring all users to install security software. Many users, however, might not install the security software on their personal computers, as some believe the security software will be detrimental to computer performance or may have driver incompatibility. Some personal computers do not follow a company's internal policy by not installing P2P software or by not applying software patches from Microsoft Corporation.

Another method of security policy enforcement is to require all users to install security software when logging on to a computer network of a particular enterprise. This method might be enforceable, but can suffer if a verification method is not provided to detect continued use of the security software. An enterprise can also utilize a probe application that periodically determines if all the computers already connected to an enterprise network have antivirus software installed. If any connected computer does not have antivirus software installed, the probe application executes an installation program to install security software on the detected computers. This method provides a greater degree of enforceability but can be unworkable as large enterprises typically have hundreds if not thousands of network users. Use of the probe application is time consuming and consumes network resources. Moreover, the execution and maintenance of the probe program may present additional problems.

Problems also arise in an enterprise that implements an intranet; intranet users and their status cannot be strictly controlled. This loosely-controlled environment provides an opportunity for computer viruses and other malicious software to infect the Intranet. Preferably, all computers connected to an Intranet should have security software installed to prevent computer virus infection and security breaches.

Enforcement of a security policy can be extremely important within an enterprise in making the network environment more secure. Such a policy can include taking steps like installing a software security patch, updating a virus pattern, etc. In some cases though, end users have difficulties in determining exactly what a policy is and implementing it themselves on their own computer. Also, some end users will not implement a particular policy and enforcement can be difficult. Further, security software implementation has been traditionally regarded as an internal enterprise task. Existing techniques, though, cannot adequately accomplish enforcement of a security software policy within an enterprise, even though more and more enterprises regard security software installation as a standard procedure.

A system and technique is desirable that would provide for simple enforcement of a network antivirus security policy.

SUMMARY OF THE INVENTION

The present invention relates to a novel technique of antivirus software policy enforcement. In one embodiment, a method enforces a security policy on a computer network by first detecting a request from a user computer to access a web site. Next, a security check is performed on the user computer to determine if the user computer has implemented a security policy of the computer network. If not, the method then returns an IP address to the user computer that is the IP address of a security web site; the IP address is not the IP address of the requested web site. The security web site is then arranged to display a message on the user computer indicating a particular security policy to be implemented on the user computer.

In a second embodiment the security web site also performs the security check. The method begins by detecting a request from a user computer of to access a particular web site. Next, the method directly returns an IP address to the user computer that is the IP address of a security web site; the IP address is not the IP address of the requested web site. The security web site then performs a security check of the user computer to determine if the user computer has implemented a security policy of the computer network. The security check is performed by software on said security web site. If a particular security policy has not been implemented, then a message on the user computer is displayed from the security web site indicating that the security policy should be implemented on the user computer.

In a third embodiment a plug-in software module of the DNS server helps to enforce a network security policy. The plug-in module begins by scanning communication packets at a DNS server computer and then intercepting a request from a user computer to access a web site. The intercepted request is not received by the DNS service. The plug-in module then initiates a security check of the user computer over a network connection to determine if the user computer has implemented the security policy of the computer network. If it is determined that the user computer does not implement the security policy then the plug-in module returns an IP address to the user computer that is the IP address of a security web site. The returned IP address is not the IP address of the requested web site.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not exact in that many groups overlap. For example, commercially available so-called "anti-virus" or "security" software is designed to scan a computer for viruses and worms, as well as for other malicious software. Of course, later developed software not currently known may also fall within the definition of malware. As used herein, the term malware is used to describe both the examples of malware and grayware described below.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another.

Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus. Computer viruses and worms have common characteristics and that they both can propagate, they are covert and their effects can be devastating. Other differences are that a virus will attack the affected program while it is running, while a worm can attack other programs; viruses typically attack local files while worms typically attack remote network computers.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file that it may send to a hacker at a later time. Often the key logger software will only awaken when a computer user connects to a secure web site such as a bank. It then logs the keystrokes, which may include account numbers, PINs and passwords, before they are encrypted by the secure web site. Software known as URL injection software modifies a browser's behavior with respect to some or all domains. It modifies the URL submitted to the server to profit from a given scheme by the content provider of the given domain. This activity is often transparent to the user.

A robot network or botnet is a large number of compromised computers that are used to create denial of service attacks or to send spam autonomously (also termed a zombie army). A target computer is often compromised via a Trojan horse that opens an IRC channel and waits for remote commands from the person in control of the botnet. The software of the botnet (botware) may be run as an independent process, but it tends to run inside other normal processes.

Other techniques used by malware include the following. A remote buffer overflow attack takes advantage of a security flaw in a computer and can be used by a worm, botnet, or by a hacker's remote control. Remote thread injection is a software development technique used to inject code into another process to run it as a thread. A hacker can use this same technology to propagate others processes without any file operations in order to disguise malware.

Another category of undesirable software is grayware. Grayware includes applications that cause annoying and possibly undesirable or unforeseen behavior in the way the programs run. Grayware is not necessarily detrimental to basic system operations, but it harbors the risk of opening computer vulnerabilities. Some applications classified as grayware are misused for malicious activity while others together and transmit information about a computer user's behavior. Grayware includes spyware, adware, dialers, hacking tools, joke programs and remote access tools.

Spyware is a piece of software that collects and sends information (such as browsing patterns or credit card numbers) about users and the results of their computer activity without explicit notification. Spyware usually works and spreads like Trojan horses. Adware is software that displays banner advertisements or pop-up advertisements when a computer is in use. Adware can have undesired effects on the system, such as interrupting an Internet connection or system operations, and is generally regarded as irritating and intrusive by users. A dialer is a program that replaces the telephone number in a modem's dial-up connection with a long-distance number (often out of the country) in order to run up telephone charges on pay-per-dial numbers, or dials out at night to send key logger or other information to a hacker.

Hacking tools render a computer or network more vulnerable to attack or use simulated hacking to test the vulnerability of accessible components. Hacking tools can be used to spy on an entire network and make it easy to exploit vulnerabilities. Although used to test the security of networks, they can be misused. Joke programs are relatively harmless although they can be annoying, such as by simulating a virus attack. Remote access tools enable remote access to an infected computer, thus permitting outside administration or manipulation. These tools are legitimate tools for managing external computers although they can be used to exploit vulnerabilities and can be misused.

Figure 1:
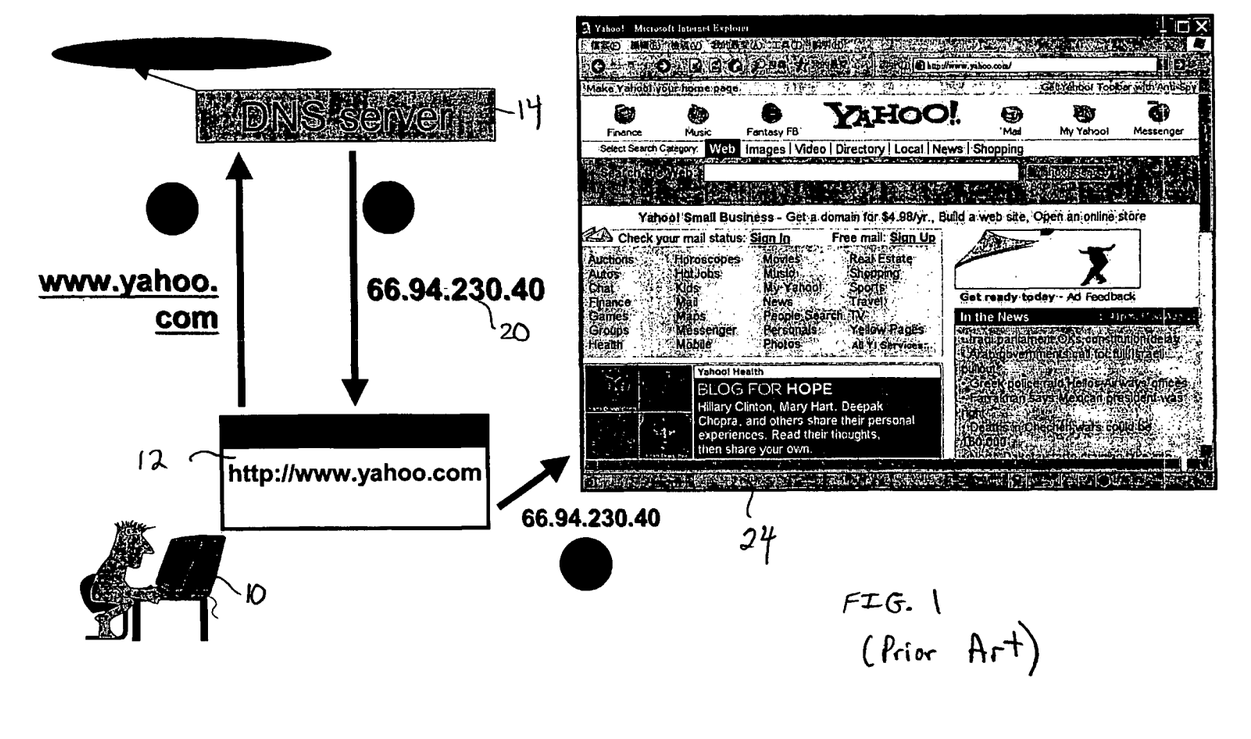
FIG. 1 illustrates how a user typically connects to the World Wide Web using the Internet.

FIG. 1 illustrates how a user typically connects to the World Wide Web using the Internet. The user types the address of a particular web site into a browser application 12 on his or her computer 10. The browser connects to a DNS server 14 in order to request the IP address of the desired web site. As is known in the art, a DNS server is a server in a network that provides a Domain Name Service that resolves host names to actual Internet addresses. For example, the Internet address of the hostname www.yahoo.com is 66.94.230.13.

The DNS server looks up the IP address of the hostname and returns that IP address to the user's browser. A browser then uses this IP address to connect over the Internet to the desired web site and the content of the web site is displayed as shown.

Policy Enforcement System

Figure 2:
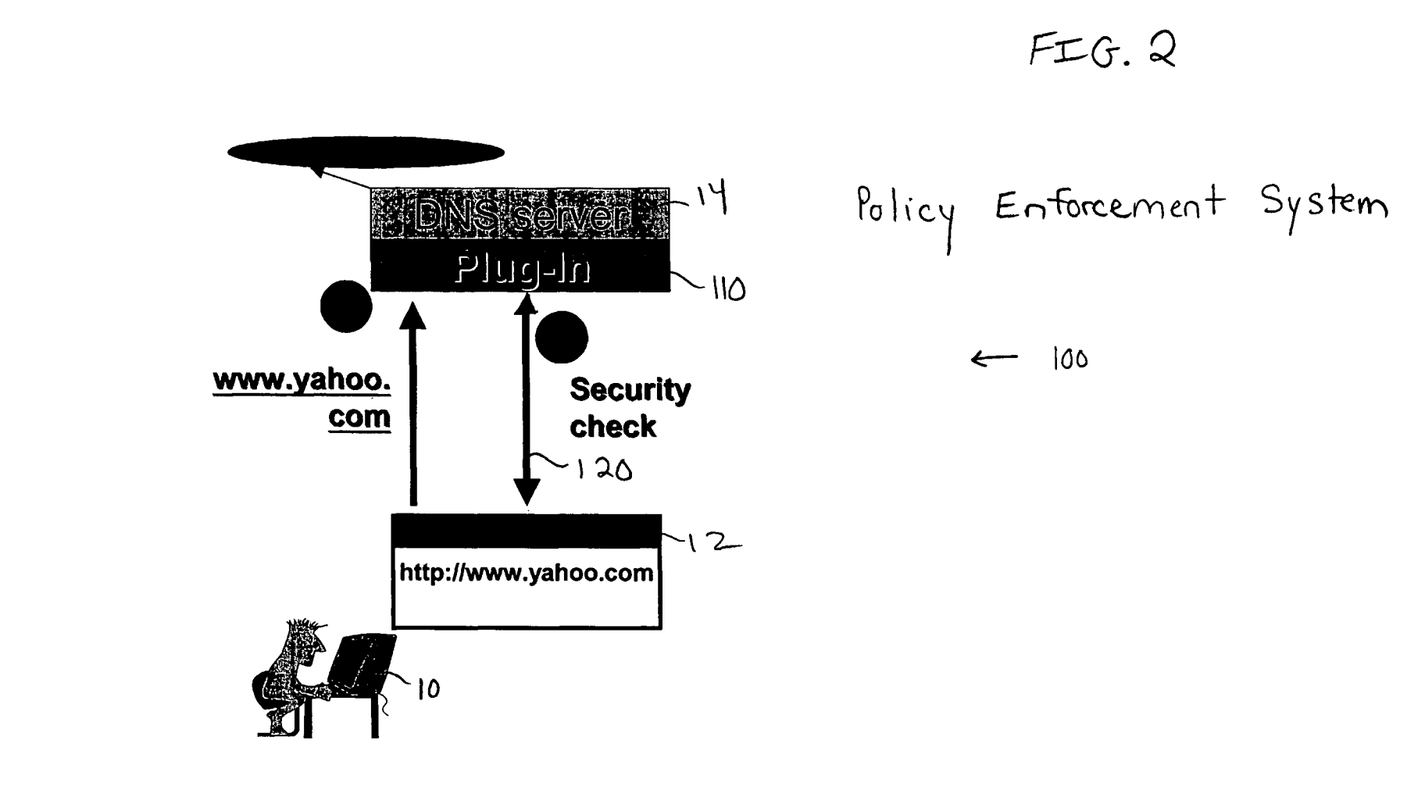
FIG. 2 illustrates a policy enforcement system according to one embodiment of the invention.

FIG. 2 illustrates a policy enforcement system 100 according to one embodiment of the invention. Shown is a DNS server 14 that includes a "plug-in" software module 110. As is known in the art, a plug-in is computer program written by someone that is integrated into another, typically more complex, software application. Plug-ins often provide additional functionality, such as a specific feature or service, that is not available in the larger application. A plug-in may also be implemented as a hardware module. Plug-in 110 may be implemented as a network level driver such as a firewall, et cetera. System 100 also includes a security check procedure 120 between the DNS server and the user's computer 10. DNS server 14 may be any suitable computer server; in one embodiment DNS server 14 is a server computer located within a particular company.

Figure 3:
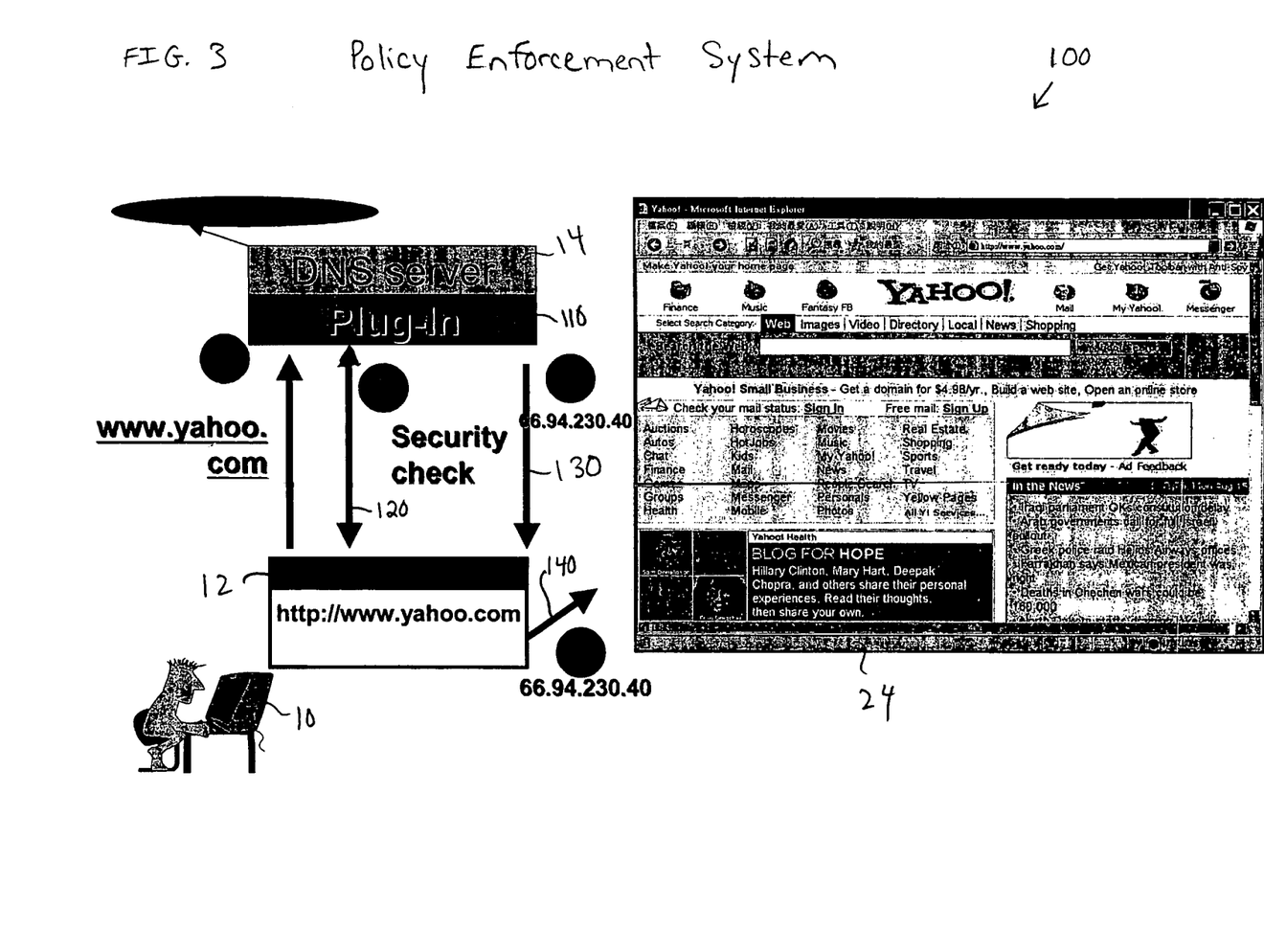
FIG. 3 illustrates the policy enforcement system in which the user's computer has passed the security check.

FIG. 3 illustrates the policy enforcement system in which the user's computer has passed the security check. Also shown is a returned IP address 130 allowing browser 12 to contact the World Wide Web 140 and to display the desired web site on the user's browser.

Figure 4:
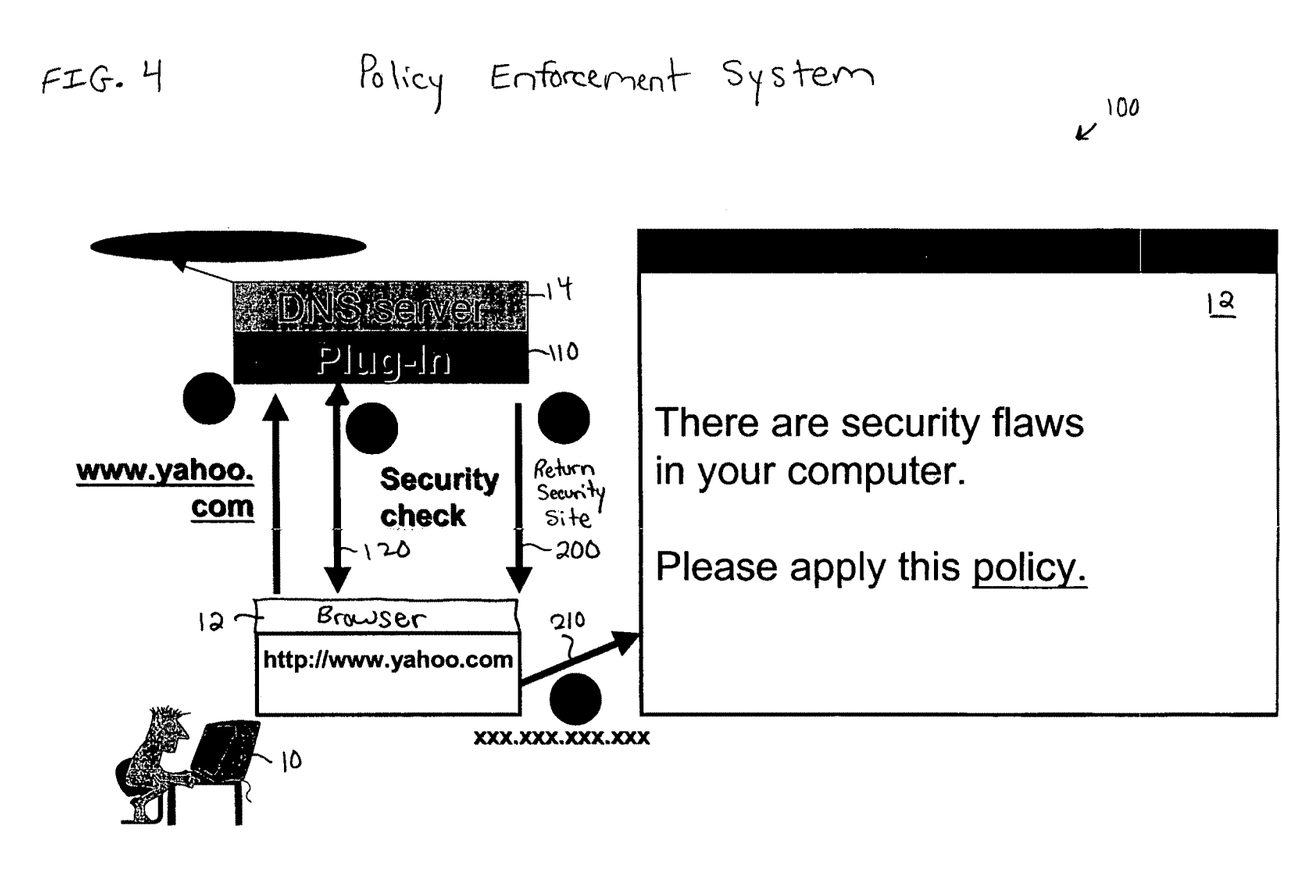
FIG. 4 illustrates the policy enforcement system in which the user's computer has not passed the security check.

FIG. 4 illustrates the policy enforcement system in which the user's computer has not passed the security check. Also shown is the return of the address of a special security site 200 from the DNS server to the user's computer that allows the user's browser to connect 210 to that security site.

When a user wishes to use the Internet to look at a particular web site the user's computer first attempts to resolve the host name of the web site to an Internet address. The machine first sends a request to a DNS server; the request is intercepted by the plug-in and the security status of the user's computer is analyzed. If the user's computer is implementing the appropriate security policy (i.e., no security flaws are found on the user's machine) then the DNS server returns the IP address of the web site that the user desires. If the machine does not implement a certain security policy (i.e., a security flaw is found on the user's machine) then a special Internet address is returned to that machine, instead of the Internet address that the user was expecting. This special Internet address is a site that allows the user to install or upgrade security measures on their computer in order to comply with the security policy in force.

The initial user's request for a web site may be intercepted by plug-in 110 in any suitable manner. In one embodiment, all network communication packets passing through the DNS server 14 are scanned and only DNS requests are intercepted, i.e., only DNS protocol packets are checked. Other packets such as HTPP, DHCP, etc., are bypassed. Preferably, as plug-in module 110 is implemented on DNS server 14 all DNS requests coming from another network devices such as a router or switch are rerouted to pass through DNS server 14 so that the plug-in module can scan the packets for any web site requests from user computers. Once it is determined that a particular user computer is requesting a web site the plug-in module determines if the user computer has already had a security check performed. A local memory cache is used to determine if the user computer has recently been checked. Preferably, if two hours have elapsed and a user computer has not been checked, then it is checked again.

The plug-in module 110 performs a security check of the user's computer 10 in any of a variety of fashions. In one embodiment, the plug-in module first determines the network address of computer 10 according to the connection messages transmitted. The plug-in module uses the network address of the user's computer to verify if the computer has antivirus software installed. For example, the plug-in module sends probe packets to the network address of the user's computer. The probe packets include TCP/UDP packets containing data for verifying the presence of particular antivirus software on the user's computer. If that particular antivirus software is present and running on the user's computer, the antivirus software reads the probe packet, recognizes the probe packet, and accordingly responds to it. If computer 10 does not respond to the probe packet, the plug-in module sends another probe packet tailored for another antivirus software to the user's computer. That is, the plug-in module has different probe packets to accommodate the different antivirus software (e.g., for different antivirus software vendors, versions, etc.) that may be running on the user's computer.

The plug-in module sends different probe packets to the network address of the user's computer until it gets an appropriate response or until it tries all of its probe packets. As is known in the art, a variety of other probe packets may be used to check for anti-spyware software, anti-phishing software, patches required for an operating system, even for patches required by other vendor's software.

If computer 10 does not respond to any of the probe packets the plug-in module assumes that the computer does not have the requisite antivirus software. In this situation, (depicted in FIG. 4) the plug-in module determines that a security flaw exists on the user's computer and the IP address 200 of a special security site is returned to the user's browser, rather than the address of the web site that the user was expecting. In this fashion, the plug-in module has intercepted traffic from the user computer before it is acted upon by the DNS server and has returned the address of a special policy enforcement web site that in one embodiment is located on a server with any particular company.

In an alternative embodiment, the user is automatically redirected to the security site 210 and a security check 120 is performed using resources at that site. For example, the "House Call" product available from Trend Micro Inc. may be used. In this example, the House Call product is implemented at a special web site and can automatically perform a security check of a user's computer over the Internet. This product checks whether a computer has been infected by various types of malware or grayware and can provide additional security checks. The product can detect and remove malware and grayware and can restore damage caused by malware. The product also notifies the user about any vulnerabilities in the installed programs and connected network services. Further, the product is compatible with various operating systems and browsers. In this fashion, a security check is performed to determine whether any of the variety of antivirus software are currently running on the user's computer. The product can also determine if a computer has installed particular antivirus software or is missing a particular security patch.

In the course of returning a security site 200 from the plug-in module to the user's computer, the plug-in module also includes data from the security check indicating which policies the user needs to implement. This data includes particular antivirus software that is missing, patches that are missing, etc. The plug-in module may also communicate with the special security site using other internal communications such as RPC, etc. Preferably, the plug-in module uses HTTPS or RPC to query the security site in order to retrieve the latest policy rules, thus ensuring that a probe of the policies on the user's computer will be up to date. In one embodiment, the plug-in module sends data resulting from the security check via HTTP to the user's computer. In the embodiment in which the special security site also performs the security check, the relevant data concerning which policies to implement is already present at that site.

Once the user's browser has been redirected to the special security site as indicated at 210, the user may be required to implement a particular security policy before continuing. For example, the site may display to the user a list of antivirus or other software that needs to be installed. Or, the site displays a list of software patches needed. In one embodiment, the site contains links for the user to download specific software patches from the software manufacturer's web site or links to download specific antivirus software. The site might also describe to the user the steps to take to implement a particular security policy. Policies may differ at each particular company. Examples of policies include: installing software agents, running a VPN agent, running a Checkpoint agent, running a Cisco agent, installing particular operating system software patches (such as those from Microsoft Corporation), prohibition against running certain Web services or certain software such as P2P, etc.

In one embodiment, software on the special security site initiates installation of security software on the user's computer. For example, a procedure is employed to copy the necessary files including the security software and associated setup module to the user's computer, and then create and start a remote service on the user's computer to launch the setup module. Thus, the security software is installed on the user's computer. Other means for remotely installing security software may also be used. For example, the user's computer may accept an ActiveX software module from the security site and the software module will download particular security software and install it on the user's computer.

In another embodiment, a special software agent is downloaded onto the user's computer to probe that computer locally and to do more extensive checking in order to find any other security flaws. Such a local software agent is useful as certain detailed information of the computer is not revealed using an outside probe. For example, this detail information includes performing a Windows registry check, performing a malicious processes check, or determining Microsoft patch information.

In this fashion, the particular security policies and antivirus software required by a particular company of its users is enforced. By requiring a security check each time the user accesses an Internet site, and requiring a new review every two hours (for example), the technique of the present invention promotes enforcement of security policies.

Computer System Embodiment

Figure 5A:
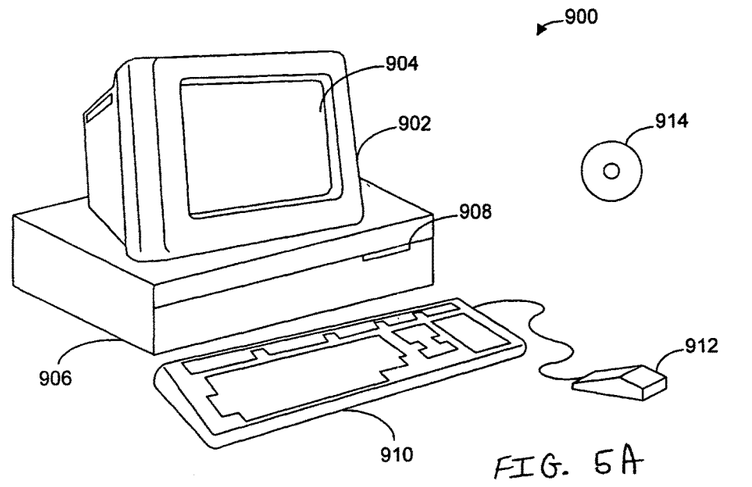
FIGS. 5A and 5B illustrate a computer system 900 suitable for implementing embodiments of the present invention.
Figure 5B:
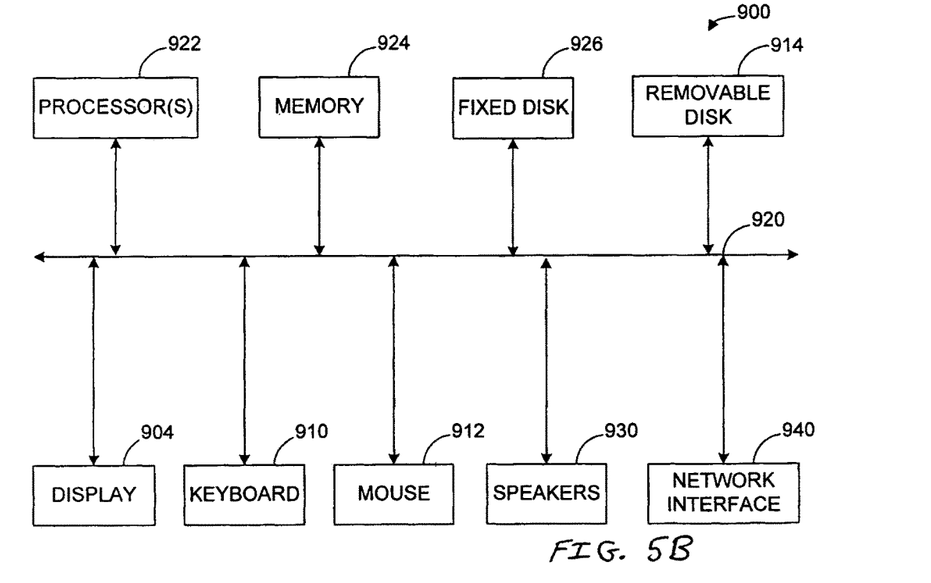

FIGS. 5A and 5B illustrate a computer system 900 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps.

Furthermore, method embodiments of the present invention may execute solely upon CPU 922 or may execute over a network such as the Internet in conjunction with a remote CPU that shares a portion of the processing.

In addition, embodiments of the present invention further relate to non-transitory and tangible computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of non-transitory, tangible computer-readable media include, but are not limited to: magnetic media such as hard disks, floppy disks, and magnetic tape; optical media such as CD-ROMs; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of enforcing a security policy on a user computer in a computer network, said method comprising:
   detecting a request from said user computer of said computer network to access a requested web site, said detecting performed by a plug-in module of a Domain Name Service (DNS) server;
   intercepting said request at said DNS server by said plug-in module such that said request is not received by a DNS service on said DNS server;
   determining a network address of said user computer by said plug-in module;
   performing a security check of said user computer by said plug-in module using one or more probe packets sent by said plug-in module to said network address to determine whether said user computer has implemented a security policy of said computer network;
   determining as a result of said security check of said user computer that said security policy is not implemented on said user computer;
   redirecting said user computer to a security Web site by returning an Internet Protocol (IP) address to said user computer that is an IP address of said security web site, said IP address not being an IP address of said requested web site; and
   displaying a message on said user computer from said security web site indicating said security policy to be implemented on said user computer.

2. The method as recited in claim 1 further comprising:
   checking a memory cache of said DNS server to determine whether said security check has already been performed on said user computer.

3. The method as recited in claim 1 further comprising:
   storing an indication in a memory cache of said DNS server that said security check has been performed on said user computer at a particular time.

4. The method as recited in claim 1 wherein said step of performing a security check is performed at said DNS server.

5. The method as recited in claim 1 wherein said security check includes determining whether said user computer is running an antivirus software application.

6. A method of enforcing a security policy on a user computer in a computer network, said method comprising:
   detecting a request from said user computer of said computer network to access a requested web site, said detecting performed by a plug-in module of a Domain Name Service (DNS) server;
   intercepting said request at said DNS server by said plug-in module such that said request is not received by a DNS service on said DNS server;
   redirecting said user computer to said security web site by returning an Internet Protocol (IP) address to said user computer that is an IP address of said security web site, said IP address not being an IP address of said requested web site;
   performing a security check of said user computer to determine whether said user computer has implemented a security policy of said computer network, said security check being performed by software on said security web site; and
   displaying a message on said user computer from said security web site indicating said security policy to be implemented on said user computer.

7. The method as recited in claim 6 further comprising:
   determining as a result of said security check of said user computer that said security policy is not implemented on said user computer.

8. The method as recited in claim 6 further comprising:
   checking a memory cache of said DNS server to determine whether said security check has already been performed on said user computer.

9. The method as recited in claim 6 further comprising:
   storing an indication in a memory cache of said DNS server that said security check has been performed on said user computer at a particular time.

10. The method as recited in claim 6 wherein said step of detecting a request is performed at said DNS server.

11. The method as recited in claim 6 wherein said security check includes determining whether said user computer is running an antivirus software application.

12. A non-transitory and tangible computer-readable medium comprising computer code for enforcing a security policy on a user computer in a network, said computer code of said computer-readable medium effecting the following:
   scanning communication packets at a Domain Name Service (DNS) server computer;
   intercepting a request from said user computer of said network to access a requested web site such that said request is received by a plug-in module of said DNS server computer and is not received by a DNS service executing in said DNS server computer;
   determining a network address of said user computer by said plug-in module;
   initiating a security check of said user computer by said plug-in module over a network connection using one or more probe packets sent by said plug-in module to said network address to determine whether said user computer has implemented a security policy of said computer network;
   determining that said user computer does not implement said security policy by examining a response from said user computer to said one or more probe packets; and redirecting said user computer to a security web site by returning an Internet Protocol (IP) address to said user computer that is an IP address of said security web site, said IP address not being an IP address of said requested web site.

13. The non-transitory and tangible computer-readable medium as recited in claim 12 further comprising computer code effecting the following:
storing an indication in a memory cache of said DNS server computer that said security check has been performed on said user computer at a particular time.

14. The non-transitory and tangible computer-readable medium as recited in claim 12 wherein said security check is performed by said DNS server computer.

15. The non-transitory and tangible computer-readable medium as recited in claim 12 wherein said computer-readable medium embodies said plug-in module of said DNS server computer.

16. The non-transitory and tangible computer-readable medium as recited in claim 12 wherein said security check includes determining whether said user computer is running an antivirus software application.

17. The method as recited in claim 1 further comprising:
installing said plug-in module on said DNS server, said plug-in module having a plurality of probe packets.

18. The method as recited in claim 1 wherein detecting a request further comprises:
intercepting only DNS protocol packets.

19. The method as recited in claim 6 wherein detecting a request further comprises:
intercepting only DNS protocol packets.

20. The non-transitory and tangible computer-readable medium as recited in claim 12 further comprising computer code effecting the following:
intercepting only DNS protocol packets.

21. The method as recited in claim 1 wherein detecting a request further comprises:
scanning packets by said plug-in module on said DNS server.

22. The method as recited in claim 6 wherein detecting a request further comprises:
scanning packets by said plug-in module on said DNS server.

23. The method as recited in claim 6 further comprising:
downloading security software from said security web site and upgrading said user computer.

24. The method as recited in claim 1 wherein said plug-in module communicates with said security web site using an internal network communication channel.

25. The method as recited in claim 1 further comprising:
querying said security Web site by said plug-in module to retrieve latest policy rules of said security policy, thus ensuring that said one or more probe packets are up-to-date.

26. The non-transitory and tangible computer-readable medium as recited in claim 12 further comprising:
querying said security Web site by said plug-in module to retrieve latest policy rules of said security policy, thus ensuring that said one or more probe packets are up-to-date.

27. The method as recited in claim 1 further comprising:
requiring said security check each time said user computer accesses a Web site.

28. The method as recited in claim 6 further comprising:
requiring said security check each time said user computer accesses a Web site.

29. The non-transitory and tangible computer-readable medium as recited in claim 12 further comprising:
requiring said security check each time said user computer accesses a Web site.

30. The method as recited in claim 1 further comprising:
determining that no security policy is implemented by said user computer when there is no response from said user computer to said probe packets sent to said user computer.

31. The method as recited in claim 6 further comprising:
determining as a result of said security check of said user computer that said security policy is not implemented on said user computer.

32. The non-transitory and tangible computer-readable medium as recited in claim 12 further comprising:
determining that no security policy is implemented by said user computer when there is no response from said user computer to said probe packets sent to said user computer.

33. The method as recited in claim 1 further comprising:
receiving said request at said DNS server, wherein said request is an attempt to resolve said requested Web site.

34. The method as recited in claim 6 further comprising:
receiving said request at said DNS server, wherein said request is an attempt to resolve said requested Web site.

35. The non-transitory and tangible computer-readable medium as recited in claim 12 wherein said communication packets include said request, and wherein said request is an attempt to resolve said requested Web site.

* * * * *